C. C. BURNETT.
Combined Ash Sifter and Bucket.
No. 232,237. Patented Sept. 14, 1880.
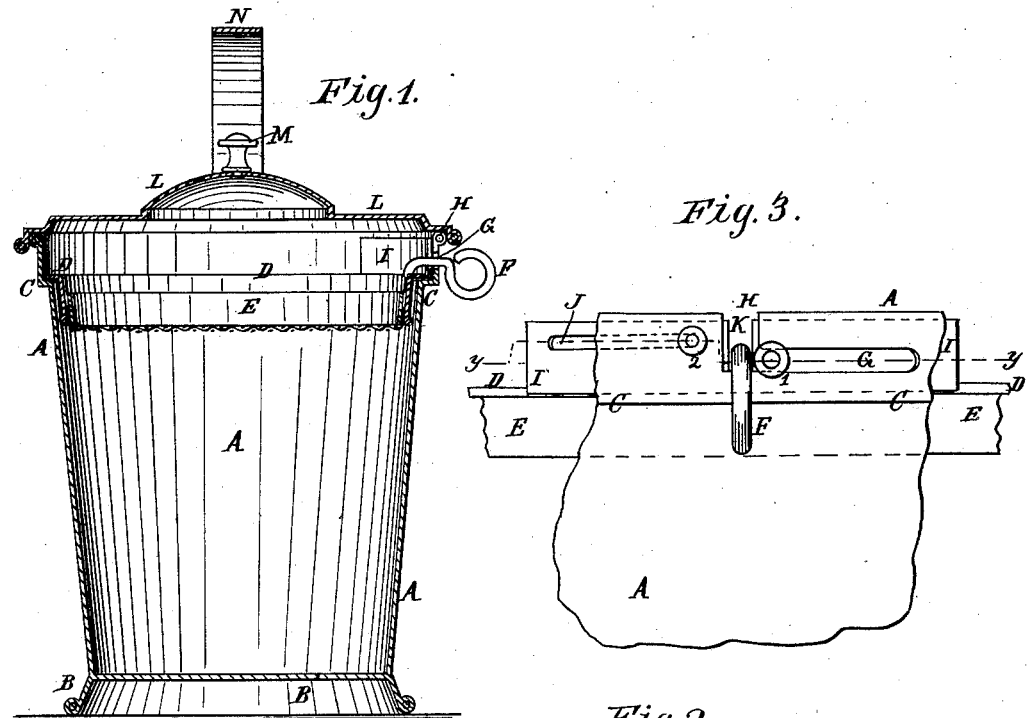

UNITED STATES PATENT OFFICE.

CHARLES C. BURNETT, OF IOWA CITY, IOWA.

COMBINED ASH SIFTER AND BUCKET.

SPECIFICATION forming part of Letters Patent No. 232,237, dated September 14, 1880.

Application filed February 17, 1880.

*To all whom it may concern:*

Be it known that I, CHARLES COMPTON BURNETT, of Iowa City, in the county of Johnson and State of Iowa, have invented a new and useful Improvement in Combined Ash Sifters and Buckets, of which the following is a specification.

Figure 1 is a sectional elevation of the improvement, taken through the line $x\ x$, Fig. 2. Fig. 2 is a plan view, partly in section, through the line $y\ y$, Fig. 3, the cover being removed. Fig. 3 is a side elevation of a part of the improvement enlarged.

Similar letters of reference indicate corresponding parts.

The object of this invention is to furnish combined ash sifters and buckets so constructed that the ashes may be sifted in a room without raising a dust, and which at the same time will be convenient in use, strong, and durable.

The invention consists in a combined ash sifter and bucket formed of the bucket made with an offset and slots in its upper part, and having a pivoted bail, the sieve having a supporting-flange and a handle, the sliding guard-plate to prevent fine ashes from escaping, and a cover, as will be hereinafter fully described.

A represents the bucket, which is made of sheet-iron, tin, or other suitable material, and of any convenient or desired size. The bucket A is made with a flaring flange, B, around its bottom to give it strength and stability. The bucket A is made with an offset, C, around its upper part, to form a shoulder or ledge to receive the outwardly-projecting flange D, formed around the upper edge of the rim or band of the sieve E.

The sieve E is formed by attaching woven wire to a band in the usual way.

To one side of the sieve E is attached a handle, F, the stem of which projects through a horizontal slot, G, in the side of the bucket A, just above the offset C.

At one end of the slot G is formed a vertical slot, H, passing up through the edge of the bucket A, as shown in Figs. 1 and 3.

The fine ashes are prevented from escaping through the slot G while the sifter is being used by a sliding guard-plate, I, placed upon the inner surface of the side of the bucket A, and connected with it by two rivets, 1 2.

The rivet 1 is attached to the sliding plate I, and passes through and slides in the slot G.

The other rivet, 2, is attached to the bucket A, and passes through a slot, J, in the plate I.

The slots G J, and their respective rivets, are placed at different heights, as shown in Fig. 3, so that the slot J will not come opposite the slot G, and thus allow fine ashes to escape.

The middle part of the plate I has a notch or slot, K, formed in it, extending downward from its upper edge, and corresponding with the slot H, to receive the stem of the handle F, so that the sieve E can be readily taken out and put in by means of the handle F and without soiling the hands.

The bucket A is provided with a closely-fitting cover, L, to prevent fine ashes from escaping while the sifter is being used.

The cover L is provided with a knob or other shaped handle, M, for convenience in putting it on and taking it off.

The bucket A is provided with a bail, N, the ends of which are pivoted to lugs O, attached to the opposite sides of the upper part of the bucket A, so that the bucket can be conveniently carried with one hand, and so that the bucket can be conveniently emptied.

With this construction cinders will not be liable to get between the side of the sieve E and the side of the bucket A, and impede or prevent the free movement of the sieve E.

Having thus fully described my invention, I claim as new and desire to secure by Letters Patent—

1. In a combined ash sifter and bucket, the combination, with the sieve E and the bucket A, having slots G H, of the rigid handle F, the sliding guard-plate I, having slot J, and the rivets 1 2, substantially as herein shown and described, whereby the fine ashes are prevented from escaping while the sifter is being used.

2. As an improved article of manufacture, a combined ash sifter and bucket constructed as herein shown and described, consisting of the bucket A, having offset C, slots G H, and pivoted bail N, the sieve E, having flange D and handle F, the sliding guard-plate I, and the cover L, all constructed and arranged as and for the purposes set forth.

CHARLES COMPTON BURNETT.

Witnesses:
LOUIS H. JACKSON,
HENRY GRUBER.